(12) United States Patent
Jenney

(10) Patent No.: US 7,131,666 B1
(45) Date of Patent: Nov. 7, 2006

(54) OFF-ROAD VEHICLE TRAILER

(75) Inventor: Richard C. Jenney, Cortland, NY (US)

(73) Assignee: Empire Welding & Fabricating, Inc., Cortland, NY (US)

(*) Notice: Subject to any disclaimer, the term of this patent is extended or adjusted under 35 U.S.C. 154(b) by 33 days.

(21) Appl. No.: 11/154,174

(22) Filed: Jun. 16, 2005

(51) Int. Cl.
*B62D 21/04* (2006.01)
*B60G 11/00* (2006.01)

(52) U.S. Cl. .................. 280/786; 280/202; 280/204; 280/414.1; 280/414.3; 280/400; 280/789; 280/787; 280/124.162; 280/493

(58) Field of Classification Search .......... 280/786, 280/789, 787, 202, 204, 400, 124.162, 414.1, 280/414
See application file for complete search history.

(56) References Cited

U.S. PATENT DOCUMENTS

| | | | | |
|---|---|---|---|---|
| 2,766,053 A | * | 10/1956 | Madruga | 280/414.1 |
| 2,933,328 A | * | 4/1960 | McIntyre et al. | 280/788 |
| 3,002,742 A | * | 10/1961 | Troy | 267/38 |
| 3,011,797 A | * | 12/1961 | Olney | 280/787 |
| 3,276,532 A | * | 10/1966 | Yonkers | 180/54.1 |
| 4,415,181 A | * | 11/1983 | McCall et al. | 280/788 |
| 5,042,831 A | * | 8/1991 | Kuhns | 280/656 |
| 6,015,022 A | * | 1/2000 | Thuliez | 180/210 |
| 6,196,564 B1 | * | 3/2001 | Hawener et al. | 280/124.162 |
| 6,428,035 B1 | * | 8/2002 | Maxwell et al. | 280/656 |

* cited by examiner

*Primary Examiner*—Lesley D. Morris
*Assistant Examiner*—Marlon Arce-Diaz
(74) *Attorney, Agent, or Firm*—Brown & Michaels, PC

(57) ABSTRACT

A trailer for all terrain vehicles and/or snowmobiles for transporting injured persons from remote locations. Trailer has a frame of tubing, a main axle, spring and shock suspension, flotation type tires, IV pole with multiple mounting locations, carrier area for injured personnel transport, and accessory tube for attaching miscellaneous accessories.

12 Claims, 2 Drawing Sheets

OFF-ROAD VEHICLE TRAILER

BACKGROUND OF THE INVENTION

1. Field of the Invention

This invention relates generally to trailer apparatus and more particularly to an All Terrain Vehicle (ATV) or Snowmobile rescue trailer apparatus with extended versatility having transformation to fire suppression system, cargo carrier and other uses using rear accessory tube.

2. Description of Related Art

Various types of utility trailers have been developed for use with ATVs and snowmobiles depending on the task to be performed. ATV/snowmobile trailers differ from other types of trailers such as they may be towed by off road vehicles in that by their nature must be capable of a wide range of terrain; in many cases it is required to be towed over uncleared land. They are generally no wider than the towing ATV/snowmobile and must be tough enough to take substantial abuse while towing over uneven terrain.

Since ATVs/snowmobiles are commonly used for recreation, as well as work related tasks there have become more accidents that occur in areas that are inaccessible via a normal jeep, truck, tractor, etc. In the fire/rescue service there has been a greater use of all terrain vehicles (ATV's) and snowmobiles to access injured parties into areas not accessible by other means of transportation (e.g. forested, steep areas.) Many trailers pulled behind ATV's can access these areas but cannot be used for the safe transport of injured parties to awaiting medical services without extensive work to modify existing trailers or extra manpower to safely steady the injured party.

SUMMARY OF THE INVENTION

The invention is an ATV trailer which has a frame of steel tubing, round tube mounted in parallel for carrier area, a heavy duty main axle with a spring and shock suspension to which on each end is mounted wheels to traverse uneven terrain. The ATV trailer of the invention can be used to traverse uneven terrains while carrying an injured party to safety with minimal manpower, and can be used to aid in the fire service with other optional equipment.

DETAILED DESCRIPTION OF THE INVENTION

The trailer (10) is constructed of structural shapes, which may be steel or aluminum or fiberglass etc.

Figure 1:
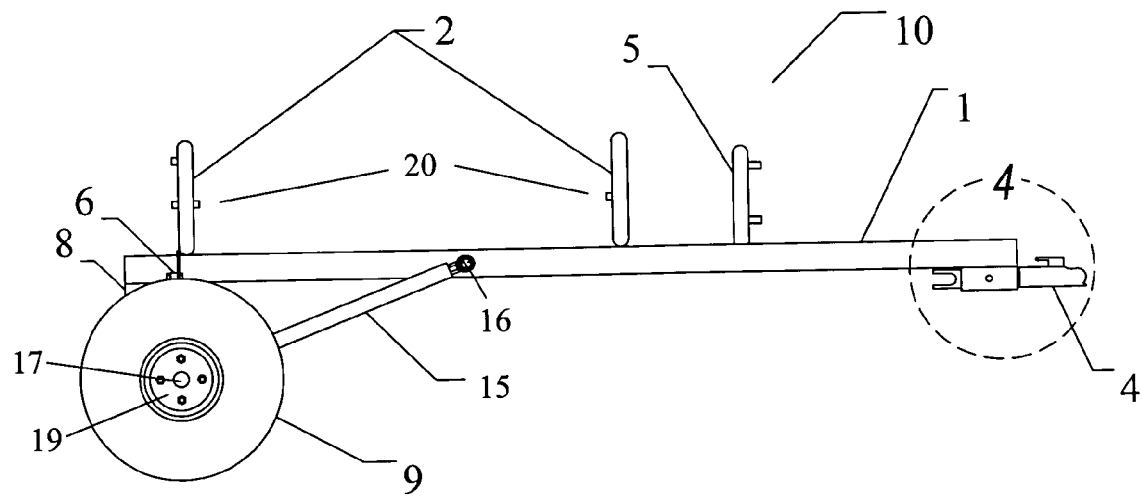
FIG. 1 shows a side view of the invention
Figure 2:
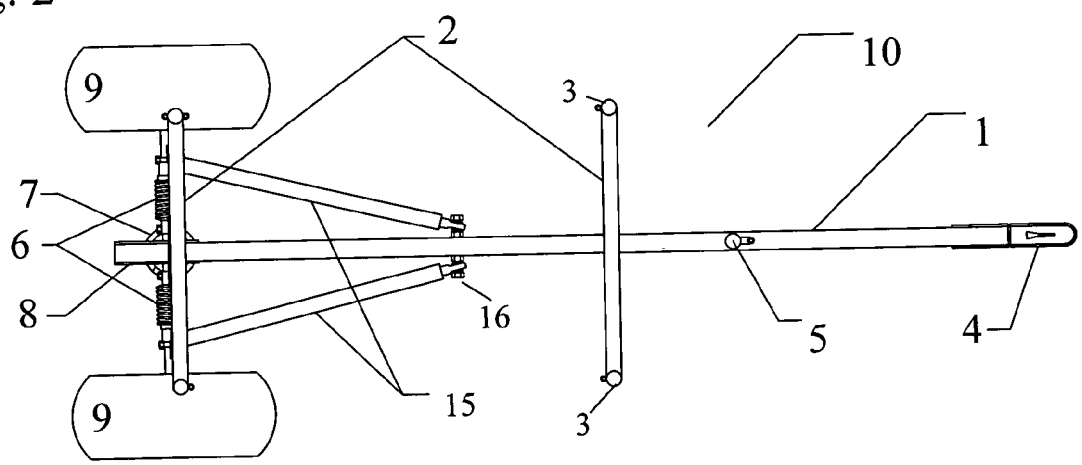
FIG. 2 shows a top view of the invention
Figure 7:
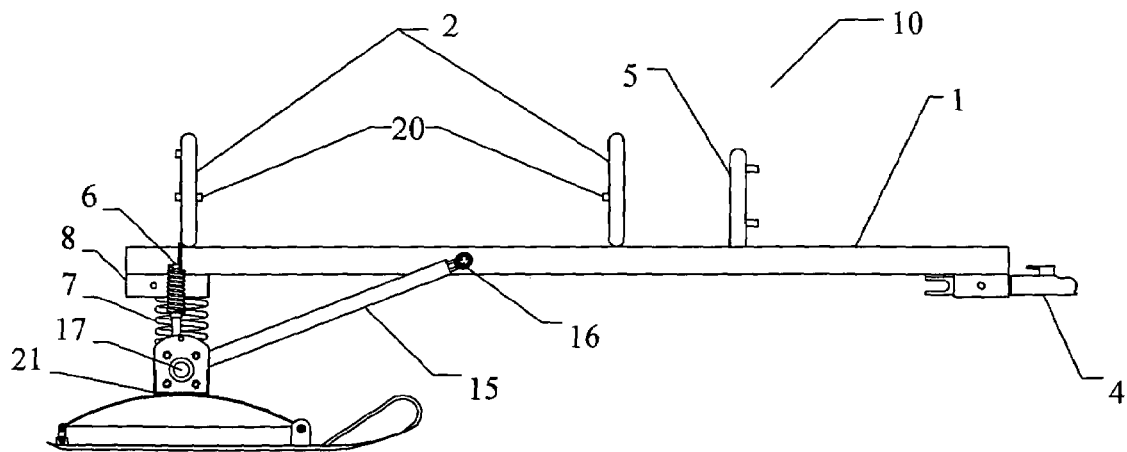
FIG. 7 shows the invention equipped with skis in place of wheels.

As seen in FIGS. 1, 2 and 7, the trailer (10) has a main frame member (1) running from a hitch assembly (4) for connecting to an all-terrain vehicle or snowmobile or the like, which will be described in greater detail below, to the undercarriage assembly mounting point and accessories tube (8) at the rear of the trailer. The length of the main member (1) should be sufficient to support a standard Stokes basket or other stretcher or load. Sufficient extra length is preferably provided at the front end to keep the Stokes basket or other load back from the towing vehicle, to minimize the danger and nuisance of mud or stones or other material thrown up by the towing vehicle.

At least two parallel horizontal tube crossmembers (2) are mounted perpendicular to the main frame member (1), having turned-up ends (3) to support and restrain the trailer load. Preferably, the horizontal tube crossmembers (2) are sufficiently wide and spaced sufficiently far apart to contain a Stokes basket or other stretcher—approximately 28" between uprights would accommodate most such devices. The crossmembers (2) should be spaced apart along the length of the frame (1) a sufficient distance to support the intended load—for Stokes baskets, a spacing of approximately 4 feet would be adequate. The crossmembers (2) and upright (3) arrangement allows mounting of additional load supports as desired—for example a tub or trough for holding loose material, or a platform with a tank and pump for back-country fire fighting, can easily be mounted to and removed from the trailer. Small rings (20), preferably at least a few on the uprights (3), allow places to anchor bungee cords or ratchet straps to anchor the trailer load.

Preferably, at least one vertical stop pole (5) is mounted to the main tube between the first horizontal tube (2) and the hitch assembly (4), to serve as a stop for the trailer load, and may serve as a place to mount IV pole for rescue use.

Figure 3:
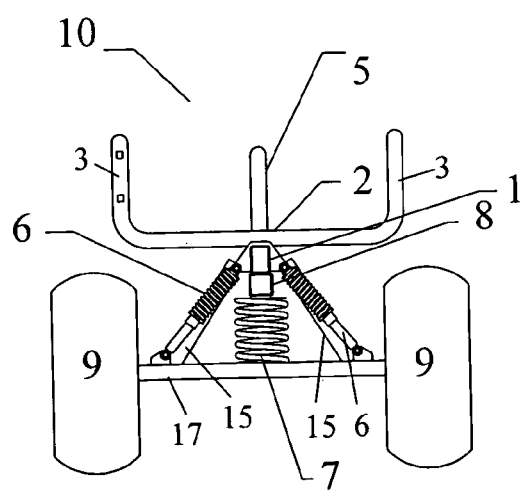
FIG. 3 shows a rear view of the invention

As seen in FIG. 3, the trailer (10) is supported by an undercarriage assembly having shock assemblies (6), an axle (17) and wheels (19). The axle (17) is crosswise under the frame (1), and the shock assemblies (6) are connected between the frame (1) and a mount adjacent the ends of the axle (17). The shock assemblies (6) are preferably of the kind having helper springs, as shown in the drawing, but may be of any other convenient kind.

A spring assembly (7), between the axle (17) and the main frame member (1), supports the trailer. It will be understood that while a coil spring (7) is shown, other types of resilient supports, such as leaf springs, air lift springs, or other types of springs known to the art, may be used.

A set of high flotation tires (9) are mounted on the wheels (19). Such tires (9) are not commonly used on trailers due to the aggressive tread. They have relatively soft rubber, and are not made for highway towing. The high flotation tires (9) along with the spring assembly (7) and shock assembly (6) improve ride and help prevent bogging in wet or heavy brush terrain. Diagonal undercarriage control arms (15) run from the axle (17) to the main member (1), and mount to the main member (1) with a pivot and pin (16). The control arms (15) steady the undercarriage assembly and prevent twisting of the axle (17).

As an optional feature, shown in FIG. 7, skis (21) may be mounted to the axle (17) in place of wheels (19) and tires (9), to allow the trailer to be used with snowmobiles on deeper snow than would be easy to traverse with the high-flotation tires.

The trailer is towable by the hitch assembly (4) coupled to the ATV by typical ball and hitch arrangement. However, other types of receivers and couplings, such as simple clevis and pin hitches, pintle hooks and rings, snowmobile couplings or other arrangements may be used.

Figure 4:
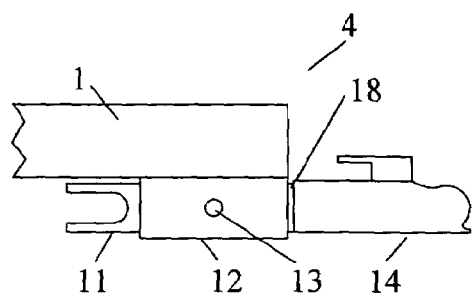
FIG. 4 shows a detail of the hitch assembly of the invention, taken from within the dashed circle denoted 4 in FIG. 1

As shown in the detail FIG. 4, the hitch assembly (4) for the trailer (10) preferably allows an interchange of hitch types, so as to be compatible with whatever emergency off-road vehicle might be available at any given time. The embodiment in FIG. 4 shows a box tube receiver (12), of the general nature of the standard hitch receivers used to attach hitch balls to automobiles. A mounting tube (18) fits within the receiver (12), and is secured in place by a pin (13) running through the receiver (12) and mounting tube (13). The mounting tube (18) can be fitted with different types of hitches on each end—the embodiment shown in FIG. 4 shows a ball-hitch receiver (14) on one end of the mounting tube (18), and a clevis-pin hitch (11) on the other. Alternatively, rings for pintle hooks, snowmobile couplings or other arrangements may be provided, as single hitch elements or in dual arrangements as shown in FIG. 4.

Another feature of the invention is best seen in FIG. 3, where we see a single tube (8) is mounted at the end of main frame (1) for accessories that may used with the trailer. Accessories may be attached through this tube and pinned in place by standard receiver pin. A hitch ball or clevis pin or the like may be mounted to this tube to allow two trailers to be pulled in tandem.

Figure 5:
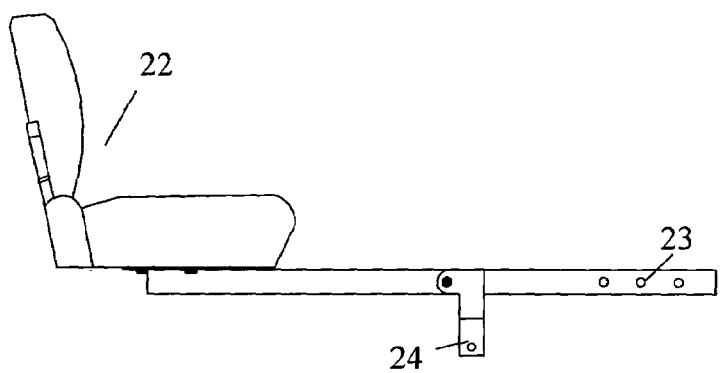
FIG. 5 shows a rear seat attachment for use with the invention

As shown in FIG. 5, rear seat (22) can be mounted through the rear accessory tube (8) via standard receiver style setup (23). This rear seat allows emergency personnel to attend to injured party during transport. It includes a seat (22) for sitting on, footrest (24) and seatbelt (not shown) for personnel safety.

Figure 6:
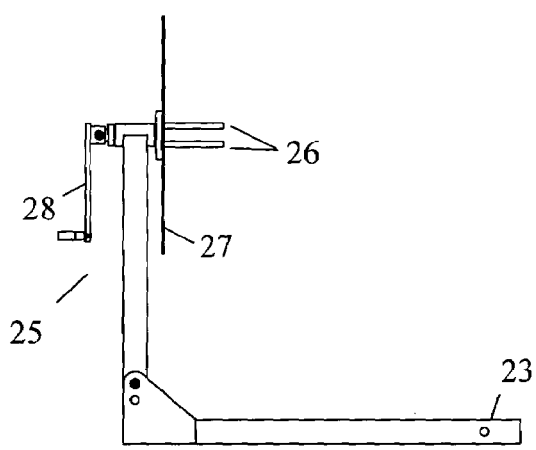
FIG. 6 shows a hose reel attachment for use with the invention

As shown in FIG. 6, a hose roller (25) can also be mounted through the rear accessory tube (8) via standard receiver style setup (23). It is also mountable in any standard class III hitch on a pickup or the like for rolling hose not mounted to the trailer. Hose is placed between the two pins (26) that extend out from the faceplate (27) and is rolled up via the hand crank (28) on the rear. If used in conjunction with an aluminum tub (not shown) mounted to the trailer, personnel may haul rolled hose back to station for final cleanup.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A trailer for off-road vehicles, comprising:
   a) a main frame member having a front end and a rear end and a length therebetween sufficiently long to accommodate a stretcher;
   b) a hitch assembly mounted to the front end of the frame;
   c) at least two horizontal tube crossmembers mounted to the main frame member and spaced apart along the length thereof, the crossmembers each having turned up ends and a length between the ends at least equal to a width of the stretcher;
   d) a stop pole mounted vertically on the main frame member, adjacent the front end;
   e) an undercarriage assembly mounted underneath the main frame member, comprising:
      i) an axle, crosswise to and centered under the main frame member, having two ends and a length therebetween;
      ii) a pair of shock assemblies, each having an upper end mounted to the main frame member and a lower end mounted adjacent to an end of the axle;
      iii) a pair of control arms, each having an upper end pivotally mounted to the main frame member and a lower end mounted adjacent to an end of the axle;
      iv) a spring assembly between the axle and the main frame member;
      v) a wheel and tire mounted on each end of the axle.

2. The trailer of claim 1, in which the tires are high-flotation tires.

3. The trailer of claim 1, further comprising skis, mounted on the ends of the axle.

4. The trailer of claim 1, further comprising an accessory tube mounted at the rear end of the main frame member.

5. The trailer of claim 4, further comprising a seat mounted to the accessory tube.

6. The trailer of claim 4, further comprising a hose reel mounted to the accessory tube.

7. The trailer of claim 1, in which the hitch assembly comprises:
   a) a box tube receiver mounted to the front end of the main frame member;
   b) a mounting tube slideably fitted within the box tube receiver, having two ends and a length therebetween;
   c) a hitch mounted an end of the mounting tube;
   d) a pin passing through holes in the box tube and the mounting tube, for securing the mounting tube within the box tube.

8. The trailer of claim 7, in which there is a hitch mounted on each end of the mounting tube, at least one of the hitches being of a size to fit through the box tube.

9. The trailer of claim 7, in which the hitches are selected from a group comprising ball hitches, pintle-hook rings, and clevis-pin hitches.

10. The trailer of claim 1, in which the spring assembly of the undercarriage is a coil spring.

11. The trailer of claim 1, in which the shock assemblies of the undercarriage comprise tubular shock absorbers with helper springs around the shock absorbers.

12. The trailer of claim 1, in which the turned-up ends of the horizontal tube crossmembers further comprise a plurality of rings for anchoring loads.

* * * * *